(12) United States Patent
Smith

(10) Patent No.: US 10,019,772 B1
(45) Date of Patent: Jul. 10, 2018

(54) DOCUMENT IMAGE ORIENTATION, ASSESSMENT AND CORRECTION

(71) Applicant: Vertifi Software, LLC, Burlington, MA (US)

(72) Inventor: Christopher Edward Smith, Brookline, NH (US)

(73) Assignee: Vertifi Software, LLC, Burlington, MA (US)

( * ) Notice: Subject to any disclaimer, the term of this patent is extended or adjusted under 35 U.S.C. 154(b) by 0 days.

(21) Appl. No.: 15/727,051

(22) Filed: Oct. 6, 2017

(51) Int. Cl.
  *G06T 3/40* (2006.01)
  *G06T 7/187* (2017.01)
  *G06T 1/00* (2006.01)
  *G06Q 40/00* (2012.01)
  *G06F 17/30* (2006.01)

(52) U.S. Cl.
  CPC ...... *G06T 1/0007* (2013.01); *G06F 17/30011* (2013.01); *G06F 17/3028* (2013.01); *G06Q 40/128* (2013.12); *G06T 3/40* (2013.01); *G06T 7/187* (2017.01)

(58) Field of Classification Search
  None
  See application file for complete search history.

(56) References Cited

U.S. PATENT DOCUMENTS

| | | | |
|---|---|---|---|
| 7,778,457 B2 | 8/2010 | Nepomniachtchi et al. | |
| 7,949,176 B2 | 5/2011 | Nepomniachtchi | |
| 7,953,268 B2 | 5/2011 | Nepomniachtchi | |
| 7,978,900 B2 | 7/2011 | Nepomniachtchi et al. | |
| 8,000,514 B2 | 8/2011 | Nepomniachtchi et al. | |
| 8,351,677 B1 | 1/2013 | Oakes, III et al. | |
| 8,655,047 B1 | 2/2014 | Walker et al. | |
| 8,995,012 B2 | 3/2015 | Heit et al. | |
| 9,111,168 B2 | 8/2015 | Smith | |
| 9,195,907 B1 | 11/2015 | Longacre, Jr. | |
| 9,286,514 B1 | 3/2016 | Newman | |
| 9,324,073 B2 | 4/2016 | Nepomniachtchi et al. | |
| 9,652,690 B2 | 5/2017 | Eid et al. | |
| 2003/0059099 A1 | 3/2003 | Tateishi | |
| 2003/0086615 A1* | 5/2003 | Dance | G06K 9/00456 382/200 |
| 2011/0123123 A1* | 5/2011 | Bastos dos Santos | G06K 9/00449 382/209 |

* cited by examiner

*Primary Examiner* — Bernard Krasnic
(74) *Attorney, Agent, or Firm* — Bulkley, Richardson and Gelinas, LLP; James C. Duda

(57) ABSTRACT

The present invention relates to methods and systems for automated processing of document images using mobile and desktop communications devices. Systems and methods are provided for expediting analysis of the accuracy and quality of captured images by such devices before transmission to a server for processing. The processes use on-device software to provide immediate feedback to the user as to whether the quality of the document photograph is sufficient for processing, without the need for intermediate communication with a server. The processes utilize component labeling, MICR character recognition methods, automatic image rotation, and weighted image scaling. The invention increases speed of processing, reduces rates of rejection, increases processor efficiency, limits memory use, identifies images with likely errors, and provides the opportunity for correction of errors at the earliest possible time.

1 Claim, 7 Drawing Sheets

Component Labeling $V_{X,Y}$

|     | (1) | (2) | (3) | (4) | (5) | (6) | (7) | (8) | (9) | (10) |
|-----|-----|-----|-----|-----|-----|-----|-----|-----|-----|------|
| (1) | 1   | 1   | 1   | 1   | 1   | 1   | 1   | 1   | 1   | 1    |
| (2) | 1   | 0   | 1   | 1   | 0   | 1   | 1   | 0   | 1   | 1    |
| (3) | 1   | 1   | 0   | 1   | 0   | 1   | 1   | 1   | 1   | 0    |

$L_{X,Y}$

|     | (1) | (2) | (3) | (4) | (5) | (6) | (7) | (8) | (9) | (10) |
|-----|-----|-----|-----|-----|-----|-----|-----|-----|-----|------|
| (1) | U   | U   | U   | U   | U   | U   | U   | U   | U   | U    |
| (2) | U   | L1  | U   | U   | L2  | U   | U   | L3  | U   | U    |
| (3) | U   | U   | L1  | U   | L2  | U   | U   | U   | U   | L4   |

FIG. 3

Component Labeling $V_{X,Y}$

| | (1) | (2) | (3) | (4) | (5) | (6) | (7) | (8) | (9) | (10) |
|---|---|---|---|---|---|---|---|---|---|---|
| (1) | 1 | 1 | 1 | 1 | 1 | 1 | 1 | 1 | 1 | 1 |
| (2) | 1 | 0 | 1 | 1 | 0 | 1 | 1 | 0 | 1 | 1 |
| (3) | 1 | 1 | 0 | 1 | 0 | 1 | 1 | 1 | 1 | 0 |
| (4) | 1 | 1 | 1 | 0 | 1 | 1 | 1 | 0 | 1 | 0 |

$L_{X,Y}$

| | (1) | (2) | (3) | (4) | (5) | (6) | (7) | (8) | (9) | (10) |
|---|---|---|---|---|---|---|---|---|---|---|
| (1) | U | U | U | U | U | U | U | U | U | U |
| (2) | U | L1 | U | U | L1 | U | U | L3 | U | U |
| (3) | U | U | L1 | U | L1 | U | U | U | U | L4 |
| (4) | U | U | U | L1 | U | U | U | L5 | U | L4 |

FIG. 4

Labeled Pixel Coordinate Locations (L6)

Zero Template Pixel, $V_{X,Y}$

|    | 1 | 2 | 3 | 4 | 5 | 6 | 7 | 8 | 9 | 10 | 11 | 12 |
|----|---|---|---|---|---|---|---|---|---|----|----|----|
| 1  | 1 | 0 | 0 | 0 | 0 | 0 | 0 | 0 | 0 | 0  | 0  | 1  |
| 2  | 0 | 0 | 0 | 0 | 0 | 0 | 0 | 0 | 0 | 0  | 0  | 0  |
| 3  | 0 | 0 | 0 | 0 | 0 | 0 | 0 | 0 | 0 | 0  | 0  | 0  |
| 4  | 0 | 0 | 0 | 1 | 1 | 1 | 1 | 1 | 1 | 0  | 0  | 0  |
| 5  | 0 | 0 | 0 | 1 | 1 | 1 | 1 | 1 | 1 | 0  | 0  | 0  |
| 6  | 0 | 0 | 0 | 1 | 1 | 1 | 1 | 1 | 1 | 0  | 0  | 0  |
| 7  | 0 | 0 | 0 | 1 | 1 | 1 | 1 | 1 | 1 | 0  | 0  | 0  |
| 8  | 0 | 0 | 0 | 1 | 1 | 1 | 1 | 1 | 1 | 0  | 0  | 0  |
| 9  | 0 | 0 | 0 | 1 | 1 | 1 | 1 | 1 | 1 | 0  | 0  | 0  |
| 10 | 0 | 0 | 0 | 0 | 0 | 0 | 0 | 0 | 0 | 0  | 0  | 0  |
| 11 | 0 | 0 | 0 | 0 | 0 | 0 | 0 | 0 | 0 | 0  | 0  | 0  |
| 12 | 1 | 0 | 0 | 0 | 0 | 0 | 0 | 0 | 0 | 0  | 0  | 1  |

DOCUMENT IMAGE ORIENTATION, ASSESSMENT AND CORRECTION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

A number of technologies have been developed to provide businesses and consumers with the ability to transmit or deposit checks and other documents electronically via desktop and mobile devices. These technologies allow users to transmit instruments such as a check by sending an image from a device such as a scanner, cell phone, tablet device, or digital camera in a matter of minutes. Users can take a picture of a document such as a check using the camera in such devices and then transmit the document image for further processing, such as submission for deposit into an account. These technologies can save money for institutions by reducing item processing costs and labor expense, and can provide substantial convenience for businesses and individuals.

The issues that must be addressed by these technologies include capturing an accurate image of the document, effectively and efficiently communicating with the user regarding the adequacy of that image, and verifying the accuracy of the data captured from the image. Recurring problems in these contexts include determining the orientation of the check image, failure to capture an image of the MICR line, and failure to capture images of both sides of the instrument. Other technologies employ various tools to attempt to address this problem. These typically involve taking a photograph of the financial instrument, transmitting the photograph to a distant server, allowing the server software to evaluate the image, and, if the image is found inadequate, communicating the failure back to the user, who must then make appropriate adjustments and try again.

SUMMARY

The present invention involves methods and systems for capturing and processing document images using mobile and desktop devices. Embodiments of the systems and methods described herein facilitate image capture and processing of images by expediting analysis of the accuracy and quality of the image captured. Some systems and methods described herein specifically involve a stationary or mobile communication device that tests and reorients the image it captures before transmission to a server for processing.

Some embodiments of the invention may allow the user to transmit images of the documents using a mobile communication device such as, for example, a mobile telephone with a camera. Other embodiments of the invention may allow the user to transmit images of the documents using a desktop device or other stationary device such as, for example, a scanner and computer.

The present invention uses on-device software to provide immediate feedback to the user as to whether the quality of the document photograph is sufficient for processing. That feedback is provided without the need for intermediate communication with a server. This results in increased speed of processing and reduced rates of rejection of images received for processing from the remote device. The invention also improves the overall experience of the remote deposit capture user by identifying images with likely errors and either automatically correcting them or instructing the user at the earliest possible time to correct them. Use of software for these processes on mobile devices with limited CPU power and memory, however, presents efficiency and capacity challenges. The invention overcomes these challenges by tailoring the processes to limit power and memory demands.

The identification of errors may include immediately determining that what the user has identified as a front image of a check has no MICR characters in the proper section of the image, thus indicating image failure, that the image is upside-down, or that the image is not, in fact, an image of the front of the check. Automatic rotation of the image may be employed to identify and correct an upside-down image. In addition, the invention may show that what the user has identified as a back image of the check has MICR characters, where none should be found, thus indicating likely failure by the user to capture the intended check image, resulting in the capture of a duplicate front check image rather than a back image.

In addition to efficiently locating and recognizing MICR characters and determining proper check image orientation, the systems and methods described herein can be used to properly scale the image of the check. This may be done by calculating the height of the MICR characters, which in turn may be used to calculate the width and height of the original check object from which the image was taken.

DESCRIPTION OF THE DRAWINGS

The present invention is described in detail with reference to the following figures. The drawings are provided for purposes of illustration only and merely to depict example embodiments of the invention. These drawings are for illustrative purposes and are not necessarily drawn to scale.

FIG. 3 shows initial steps of a component labeling process.

FIG. 4 illustrates the labeling merger process.

DETAILED DESCRIPTION

The purposes of the present invention include the validation and correction of images of financial documents captured on a remote device to ensure that correct and quality images are delivered to a deposit processing service. The invention ensures that, when an image of a financial document is delivered from a remote device: (1) an MICR line is shown on the front check image; (2) the MICR line is on the bottom of the front image and the document is thus upright; (3) there is no MICR line on what the user has identified to be a back check image; and (4) the MICR line is readable and thus the front image is of reasonable (readable) quality. In addition, the invention scales the check image to a reasonably accurate approximation of the actual physical document. As a result, the front and back images of the financial instrument are delivered for processing more efficiently and with a higher likelihood of success.

Figure 1:
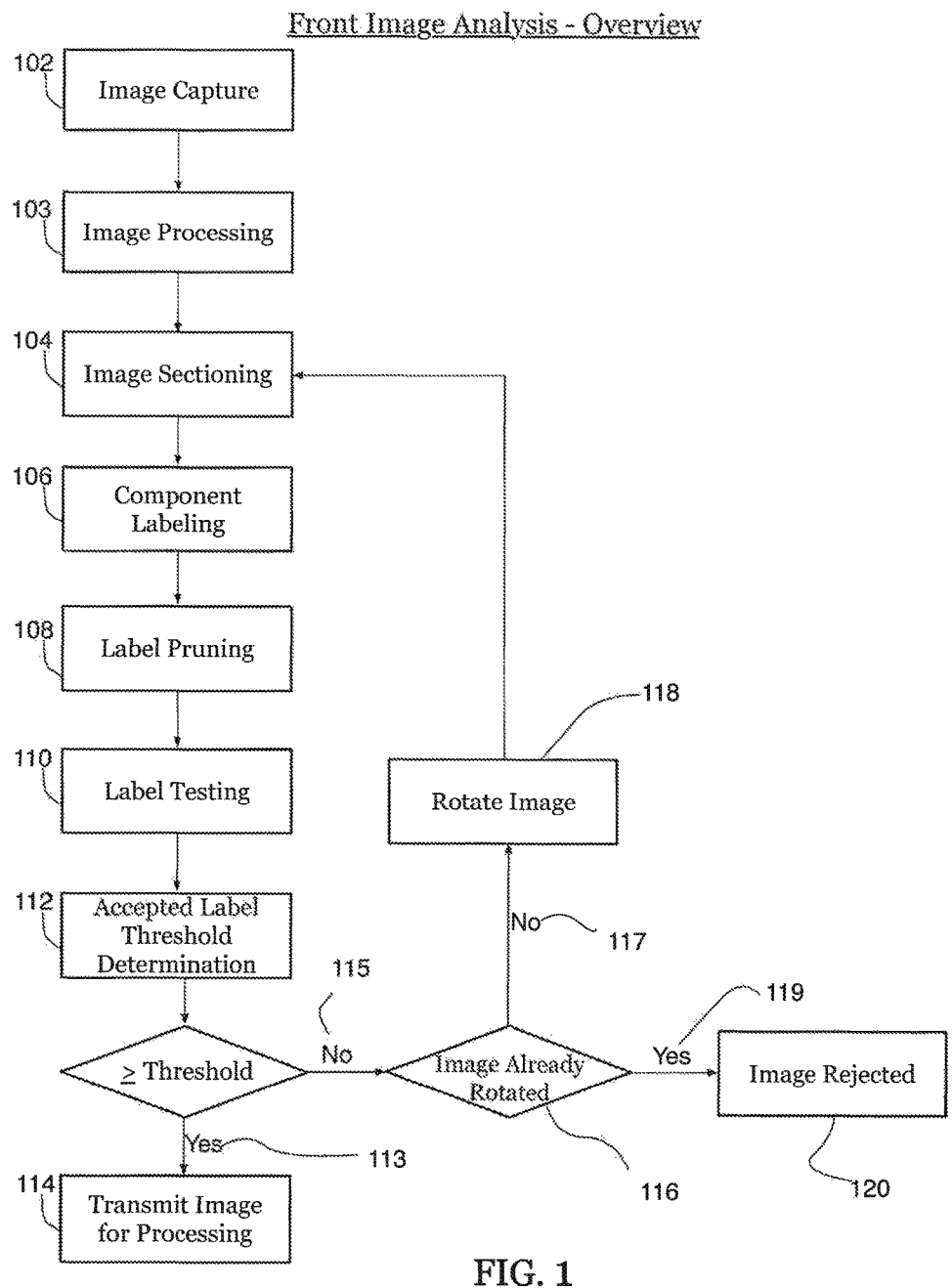
FIG. 1 is a process flow diagram showing the various processing steps for the analysis of an image of the front of a check.

The present invention provides an efficient mechanism for performing these analyses, as follows. FIG. 1 depicts the overall process encompassed by this invention as applied to the front image of a check.

A camera device is used to capture an image of the front of the document 102. It may also be used to take a picture of the back of the document. Software within or associated with the device may be used to process the image 103, such as to recognize the corners and/or the edges of the document, to geometrically correct the image to provide a rectangular document image, and to scale to a check sized document; that is, with a range of approximately 1140 to 1880 pixels and at 200 dots per inch ("dpi"), 5.7 to 9.4 inches. In some embodiments, the image may then be converted to black and white.

Image Sectioning.

Figure 2:
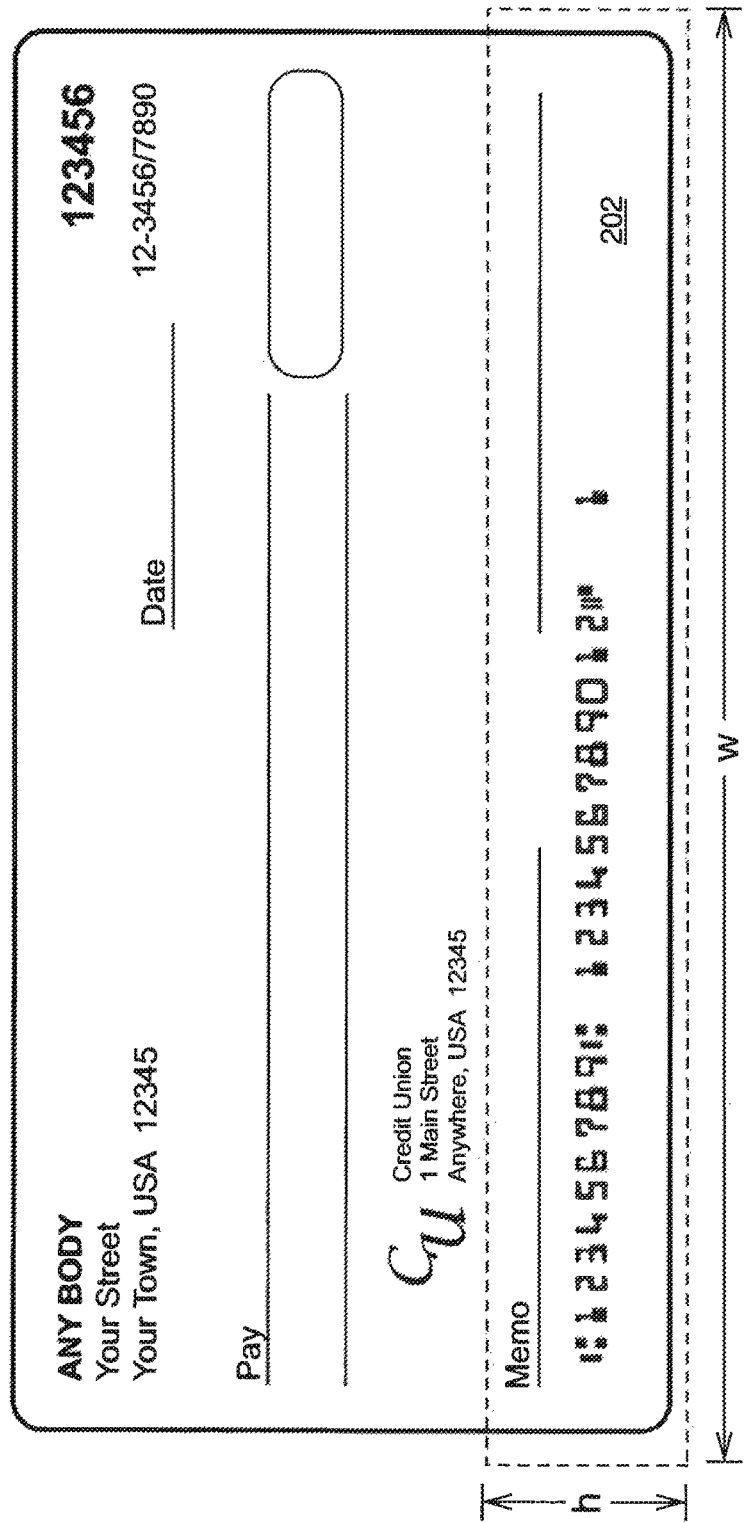
FIG. 2 is an image of a check identifying the area of a clear band subregion.

Also in some embodiments, the image may be sectioned 104, which can increase the speed of image evaluation processing by restricting the area of the check image to be evaluated to a narrow slice of the image. As shown in FIG. 2, because an MICR line is found only along the bottom area of a check in what may be called the "clear band," only a band, of width=w and height=h, of the bottom of the image (e.g., 25% of height of the image from the bottom edge) 202 may be inspected.

Component Labeling.

Component labeling 106 may then be applied to identify the location of potential characters. The software within or associated with the image capture device may create an initial map of pixel labels for the image band that is [w×h] in size, with each entry initialized with a marker identifying the pixel as unlabeled. The device may then scan the image band, pixel-by-pixel. In one embodiment, this is done consecutively left-to-right, scanning horizontally along each row of pixels in the band, beginning with the top row of pixels, scanning the entire row, moving down to the next row of pixels, scanning the entire row, and continuing the process row by row to the bottom row of pixels, which may be scanned last. Each pixel may be assigned an intensity value, V. For a binary image, V is equal either to 1 or to 0. In a gray level image, V will take on a range of values; for example: $V=\{51, 52, 53, \ldots, 77, 78, 79, 80\}$.

The software associated with the device may apply connected component labeling during the scanning process. In one embodiment, the input is binary and 8-connectivity is used; that is, a second black pixel will be considered connected to a first black pixel if the second black pixel is located to the left or the right of, directly above or below of, or diagonally adjacent to the first black pixel.

Pixel labelling may be used. If the image is binary, the location of each black pixel, for which $V=\{0\}$, will be assigned a label (L). The location of the first pixel encountered for which $V=\{0\}$ is labeled (e.g., L1). Subsequently, when another pixel location, $p_{x,y}$, is found for which $V=\{0\}$, the locations of the four neighbors of $p_{x,y}$ that have already been encountered in the scan (e.g., (i) the pixel to the left of p [that is, $p_{x-1,y}$], (ii) the pixel above it [that is, $p_{x,y-1}$], (iii) the left upper diagonal pixel [that is, $p_{x-1,y-1}$] and (iv) the upper right diagonal pixel [that is, $p_{x+1,y-1}$]) are evaluated. The pixel location, $p_{x,y}$, may then be labelled as follows:

If all four neighbors are $V=\{1\}$, assign a new label (e.g., L2) to $p_{x,y}$;

if one and only one pixel neighbor has $V=\{0\}$ and thus a label (e.g., L1), assign that label to $p_{x,y}$; else if more than one of the neighbors have $V=\{0\}$ and thus have been assigned a label (e.g., L1 and L2), assign one of the labels to $p_{x,y}$, and merge the labels (e.g., all pixel locations with L2 assigned L1 (i.e., L2=>L1)).

FIG. 3 presents the results of the initial row scans of a simplified example of the binary, 8-connectivity component labeling process for a 10 pixel wide segment of the subregion band of the document image. In this example, the scan of the first row of pixels finds no black pixels (i.e. $V=\{1\}$), thus $V_{1,1}$ through $V_{10,1}$ are all ones. Correspondingly, none of these pixel locations are assigned a label in the first row of the image's label map, $L_{x,y}$, so that each location remains unlabeled (U).

Further in this example, the scan of the second row of pixel locations finds black pixels ($V=\{0\}$) at $p_{2,2}$, $p_{5,2}$, and $p_{8,2}$. The processor also determines that none of these locations has a black pixel as its neighbor pixel location above, to the left, or diagonally above. Thus, as shown in FIG. 3, the process assigns each of these pixel locations a different label in the second row of the label map; that is, for example, labels L1, L2, and L3, respectively.

The scan of the third row of pixel locations in the subregion of the document image finds black pixels ($V=\{0\}$) at $p_{3,3}$, $p_{5,3}$, and $p_{10,2}$. The processor then determines that the pixel location $p_{3,3}$ has a diagonal left neighbor that already has been assigned a label L1 in the second row of the corresponding label map, $L_{x,y}$. It therefore assigns the same label (L1) to pixel position $p_{3,3}$. The processor also finds a black pixel at $p_{5,3}$. Because the pixel $p_{5,2}$ location directly above that pixel already has received label L2 in the label map, pixel location $p_{5,3}$ is assigned the same label (L2). The scan next finds a black pixel at $p_{10,3}$. There is no connected black pixel at this location, so position $p_{10,3}$ in the label map is assigned a new label, L4.

FIG. 4 continues the above example, showing merger of labels when a pixel location is found to have multi-connectivity to already labelled pixel locations. In the example, the scan of the fourth row of pixel locations finds a black pixel ($V=\{0\}$ at $p_{4,4}$. The pixel location to its diagonally above, left position (that is, $p_{3,3}$) has already been assigned L1 in the corresponding label map, $L_{x,y}$. Also, as shown in FIG. 3, the pixel location to its diagonally above, right position (that is, $p_{5,3}$) was already assigned a different label, L2. Because pixel $p_{4,4}$ is connected to pixels with two different labels, the two labels, that is, labels L1 and L2, are "merged" into label L1, and pixel location $p_{4,4}$ takes on that same label, L1, as shown in FIG. 4. Thus, pixel locations $p_{3,3}$, $p_{3,5}$, and $p_{4,4}$, because they are 8-connected, are given the same label; in this case, L1.

The continued scan of the fourth row finds a black pixel at $p_{8,4}$. This is not connected to any black pixel location that so far has been identified, so it is assigned a new label, L5, in the label map. The last pixel in the fourth row, $p_{4,10}$, of this example is also found to be black, but it is connected to the black pixel location $p_{3,10}$, directly above it, so it takes on the label of $p_{3,10}$; that is, L4.

The process continues until all rows have been scanned and labels assigned. The labeling and merging process may occur during a single scan that incorporates the merger process, as in the above example, or all pixel locations may be labeled during an initial scan with the merging process occurring during a second scan of the individually labelled pixels.

The process results in label arrays ($L_a$, $L_b$, . . . $L_i$), with each label containing a collection of addresses of pixel locations, $p_{x,y}$, that are mapped to that particular label; that is, $p^{map}[x,y]=L_i$. Each label array thus identifies the locations of those pixels that are connected, representing the location of a connected series of black pixels. For example, for the labeled pixel locations shown in FIG. 4, an array of L1 labels has been created with coordinates {(2,2), (2,5), (3,3), (3,5), (4,5)}. The pixel mapping allows the labelling process to be fast, as the analysis of each pixel for connectivity need only consider four adjacent pixel locations.

Label Pruning.

Figure 5:
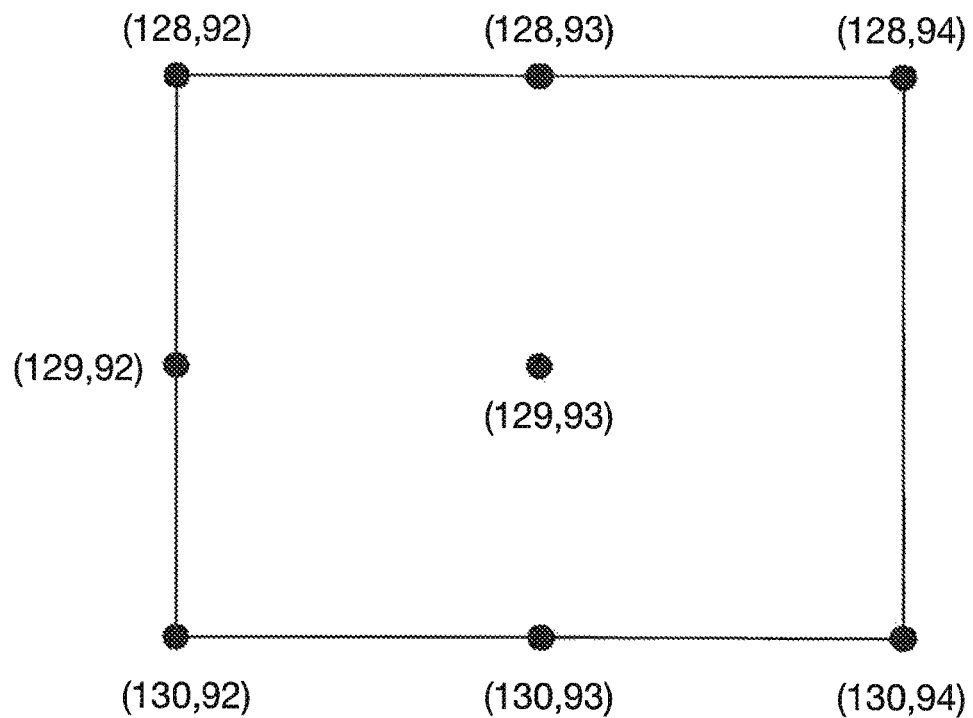
FIG. 5 illustrates the use of bounding boxes to measure height and width of labels.

The number of labels may be pruned for efficiency to eliminate label arrays that most likely do not represent characters of interest 108. Each label array has a "bounding box" defined as a rectangle determined by the coordinates of the label's outer most pixel locations. By way of simple example, as shown in FIG. 5, if label array L5 consists of pixel locations with coordinates {128, 92}, {129, 92}, {130, 92}, {128, 93}, {129, 93}, {130, 93}, {128, 94}, {130, 94}, its bounding box would be determined by the horizontal and vertical lines passing through coordinates {128, 92} and {130, 94}. In practice, to improve speed and efficiency of process, label arrays whose bounding box is too large (e.g., >38 pixel height or width) or too small (e.g., <20 pixel height or <10 pixel width) to possibly identify an MICR numeric character (0 thru 9) may be discarded. This eliminates connected pixel objects that are not likely to constitute MICR characters.

Label Testing.

Label arrays remaining after pruning (if pruning is used) represent candidate MICR characters and may be tested to determine whether they designate a character of interest 110. The bounding boxes for these candidate character labels may be extended with white pixels to result in a label box of size n×n pixels. For example, a label array measured at 18 pixel width×32 pixel height may be normalized with the candidate character left-justified and white pixels added to the right as "fill" to form a 32×32 pixel map.

Each label may then be compared to character templates. For example, the comparison may be to a reference set of the United States standard E13B font for the MICR characters 0 through 9, each of which characters are full height with all black pixels contiguous. The MICR templates often are normalized as square m×m bitmaps (for example, 96×96). The comparison is done pixel by pixel using simple linear mathematics to transpose the location of each pixel in the n×n label array and compare it to the comparably located pixel in the m×m character template array. Thus, for example, if the MICR template consists of 96×96 pixels and the label box is normalized to an array of 32×32 pixels, the value of each label assigned to pixel location $p_{x,y}$ may be compared to the value of the template pixel $t_{3x,3y}$.

Figure 6:
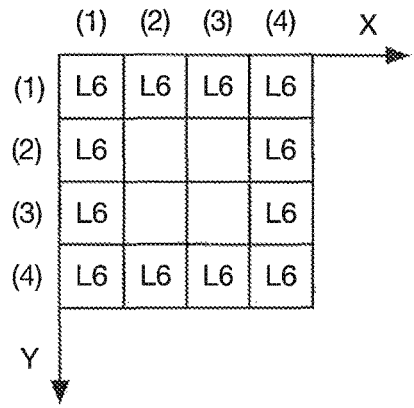
FIG. 6 illustrates the process of comparing labeled pixel locations to character template pixel locations.

FIG. 6 presents a simplified example of the label testing process for a hypothetical array of pixel locations with label L6 tested against a binary character template for the number zero. In this example, the normalized label array is only four by four, and the template character array, showing luminosity values $V=\{0\}$ (i.e., black) or $V=\{1\}$ (i.e., white), is only twelve by twelve. Comparing the location of each $p_{x,y}$ bearing an L6 label to the corresponding luminosity value of the pixel at the corresponding character pixel location, $t_{3x,3y}$, it is apparent that there is a "match" of a labeled pixel location to a character pixel location with black luminosity (with $V=\{0\}$) at $p_{1,1}$, $p_{1,2}$, $p_{1,3}$, $p_{1,4}$, $p_{2,1}$, $p_{2,4}$, $p_{3,1}$, $p_{3,4}$, $p_{4,1}$, $p_{4,2}$, and $p_{4,3}$; that is, corresponding to character pixel locations $t_{3,3}$, $t_{3,6}$, $t_{3,9}$, $t_{3,12}$, $t_{6,3}$, $t_{6,12}$, $t_{9,3}$, $t_{9,12}$, $t_{12,3}$, $t_{12,6}$, and $t_{12,9}$. The only labeled pixel position without a match to a black pixel location in the character template is $p_{1,4}$. The comparison process can result in a matching score, representing the number of pixel locations in a label array that match the corresponding character template pixel. In the above example, there were matches for 11 out of the 12 labeled pixel locations, resulting in a score of 92%. The more typical label array would be 32×32. In practice, the test may be run for each label array relative to each of the ten character templates for the numeric characters zero through nine. Candidate characters with a matching score below a first threshold (e.g., 85%) for a label array may be discarded as candidate characters for that label. If a label array has a matching score above the first threshold for more than one candidate character array, the candidate character with the highest matching score for the label array may be accepted as the character designated by that particular label array.

MICR Line Presence.

The total number of label arrays with a matching score above the threshold for a candidate character ("Accepted Labels") may then be determined 112. An MICR line may be deemed to be present in the image if there is a number of Accepted Labels, and thus MICR characters, equal to or greater than a second threshold (e.g., >=5) 113. The image may then be transmitted for processing 114. If it is found that there are not a number of Accepted Labels whose score is equal to or exceeds the second threshold 115, the MICR line may be deemed not to be present in the subregion of the document image as oriented.

Upside-Down Testing.

If the MICR line is deemed not to be present 115, the device may determine whether it has rotated the image 116 and, if not 117, rotate the image 180 degrees 118. The above described procedure may be carried out again, as shown in FIG. 1, to determine if the image was upside down when analyzed. If the number of Accepted Labels equals or then exceeds the second threshold 113, the image with the 180 degree rotation is accepted as the front image of the financial document and may be transmitted for processing 114. If the number of Accepted Labels does not exceed the second threshold 115 and the image already has been rotated 119, the image may be rejected 120.

Back Image Validation.

Figure 7:
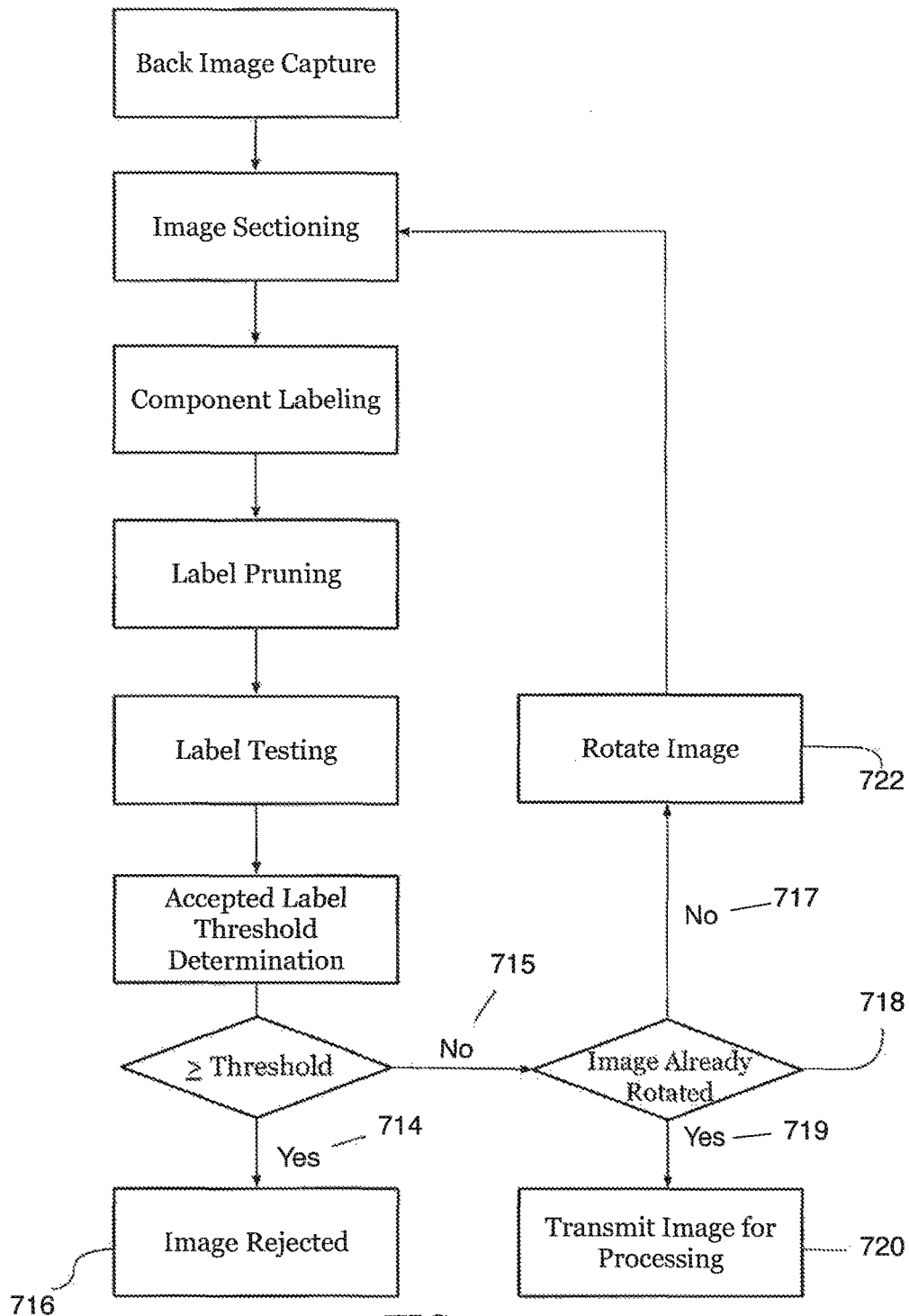
FIG. 7 is a process flow diagram showing the various processing steps for the analysis of an image of the back of a check.

If the document is a check, the image that the user has designated as the image of the back of the check may then also be evaluated using the above procedure. FIG. 7 summarizes this process. If the labels so generated equal or exceed the accepted label threshold determination 714 and thus indicate the presence of an MICR line, it may be concluded that, because an MICR line appears where no MICR line should appear (that is, on the back of a check), the user likely has failed to flip the check to take a proper image of its back and the second image may be rejected 716. Conversely, if no MICR line is detected 715, the document may be deemed a proper check back and transmitted for processing 720. Alternatively, the processor may consider whether the check has been reanalyzed after rotation 718, and if it has not 717, the check may be rotated and reanalyzed. If it is similarly determined that the accepted label threshold has not been reached 715 after rotation 718, thus indicating no MICR line present, then the image may be determined to be a proper back check image and be transmitted for processing 720.

Image Scaling.

Proper sizing of captured check images results in improved performance of check processing software, and sizing and character density criteria, such as ANSI X9.100-160-1-2015, may need to be satisfied. For example, applicable standards may require that images of checks be 200 dpi and between 1140 and 1880 pixels, corresponding to checks of 5.7 to 9.4 inches in width.

Image scaling for documents for which an MICR line is found may thus be carried out. This may be accomplished by first calculating a weighted average height ($H^w$) of the heights of the Accepted Labels ($H_i$). The weighting is based upon the relative matching scores of the Accepted Labels ($L_i$). For example:

If $L_1$, with height $H_1$, has a matching score of >0.975, then its weighting factor=$7H_1$ If $L_2$, with height $H_2$, has a matching score of >0.95 but ≤0.975, then its weighting factor=$3H_2$ If $L_3$, with height $H_3$, has a matching score of >0.925 but ≤0.95, then its weighting factor=$2H_3$ If $L_4$, with height $H_4$, has a matching score of >0.9 but ≤0.925, then its weighting factor=$1H_4$ The weighted average height, $H^w$, is then calculated. For example, if there are a total of 10 characters with Accepted Labels found, and 4 are of $H_1$ and 6 are of $H_2$, then:

$$H^w=[(6*7H_1)+(4*3H_2)]/54$$

A known MICR height of ⅛ inch (e.g., 25 pixels at 200 dpi) may be used to determine the approximate actual width ($W^m$) of the check; that is:

since $(25/W^m)=(H^w/w)$, where $w$ is the width of the source image, then $W^m=(25*w)/H^w$.

$W^m$ must be within established parameters (e.g., standard check sizes of 1140 to 1880 pixels), or the value may be discarded and the check not scaled.

The invention claimed is:

1. A method for scaling an image of a document consisting of a plurality of pixels, said scaling comprising:
   a. acquiring on a device an image of a document consisting of a plurality of pixels;
   b. determining a luminosity of a plurality of the pixels;
   c. creating distinctive label groups by assigning a unique label to each group of contiguous locations of pixels of a first specified luminosity, whereby each pixel location in a group has a common label;
   d. selecting a specified set of known characters of a defined font, each said known character comprising a set of character defining pixels of known relative location and known luminosity;
   e. selecting a second specified luminosity, wherein said second specified luminosity may be the same as or different from said first specified luminosity;
   f. for each pixel location within each said distinctive label group, determining the luminosity of the character defining pixel at the similar relative pixel location within each set of character defining pixels;
   g. for each pixel location within each said distinctive label group and for each set of character defining pixels, determining whether each said pixel location matches the similar relative pixel location of a character defining pixel of a second specified luminosity within each set of character defining pixels;
   h. determining a number of said matches for each distinctive label group and each known character;
   i. for each distinctive label group with a said match in excess of a threshold number, assigning to the distinctive label group the known character with a highest number of said matches;
   j. calculating a matching score for each distinctive label group with an assigned known character by determining a proportion of pixel locations within the distinctive label group with a label-candidate character pixel match;
   k. calculating a height of each distinctive label group with an assigned known character;
   l. weighing said calculated height of each said distinctive label group by its said matching score;
   m. determining an average weighted height of all distinctive label groups with an assigned known character using said calculated weighted heights;
   n. determining a width of the document image based upon said average weighted height of all distinctive label groups with an assigned known character; and
   o. scaling a size of the document image based upon said average weighted height.

* * * * *